Figure 1:
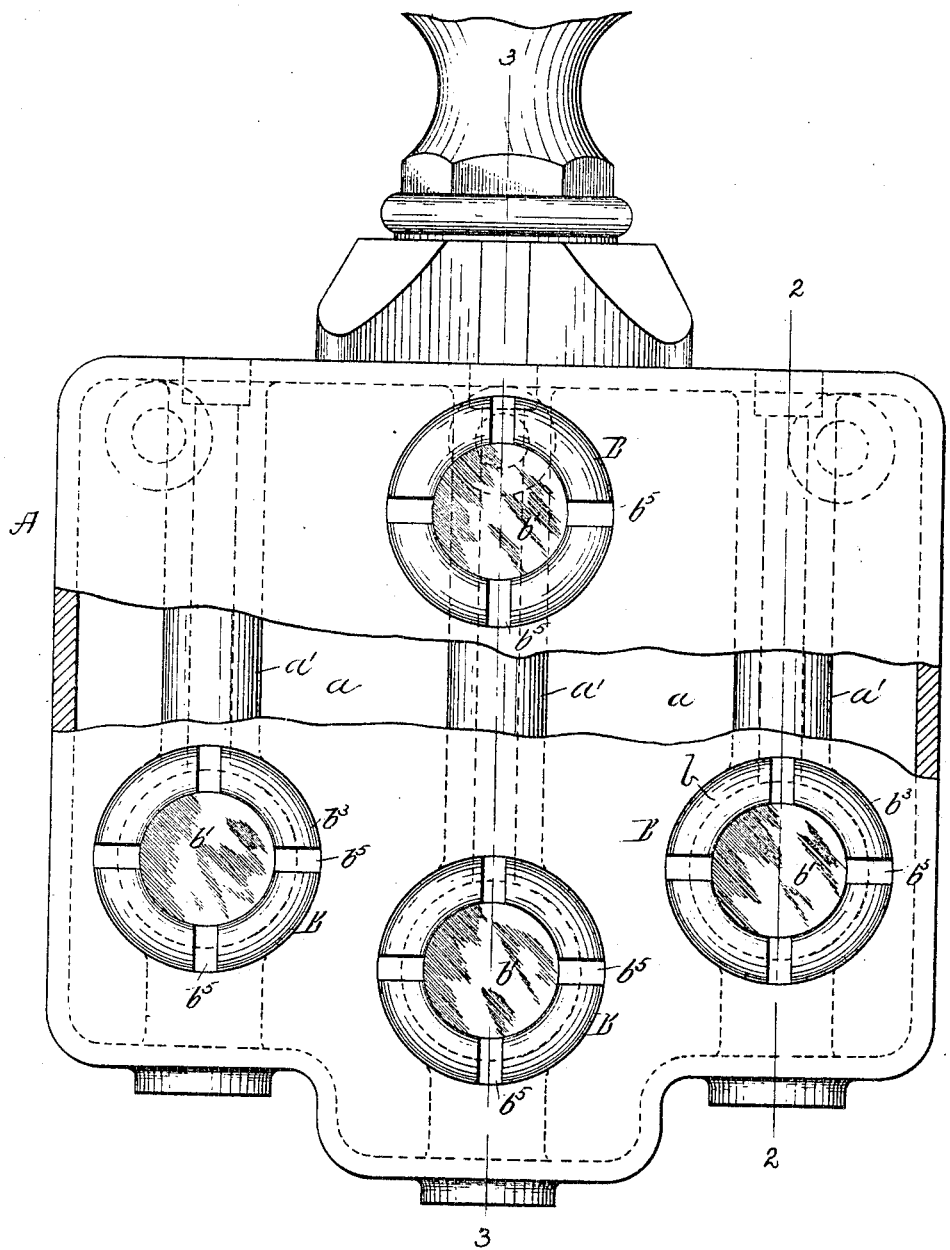

No. 798,656. PATENTED SEPT. 5, 1905.
C. B. BOSWORTH.
BULL'S EYE.
APPLICATION FILED APR. 4, 1904.

3 SHEETS—SHEET 3.

WITNESSES.
INVENTOR.

UNITED STATES PATENT OFFICE.

CHARLES B. BOSWORTH, OF SOMERVILLE, MASSACHUSETTS, ASSIGNOR TO STAR BRASS MANUFACTURING COMPANY, OF BOSTON, MASSACHUSETTS, A CORPORATION OF MASSACHUSETTS.

BULL'S-EYE.

No. 798,656.    Specification of Letters Patent.    Patented Sept. 5, 1905.

Application filed April 4, 1904. Serial No. 201,404.

*To all whom it may concern:*

Be it known that I, CHARLES B. BOSWORTH, a citizen of the United States, residing at Somerville, in the county of Middlesex and State of Massachusetts, have invented a new and useful Improvement in Bull's-Eyes, of which the following is a full, clear, and exact description, reference being had to the accompanying drawings, forming a part of this specification, in explaning its nature.

My invention relates to an improvement in bull's-eyes or sights especially adapted for lubricators or other devices in which the lubricator is subjected to high internal pressure. In the bull's-eyes hitherto made for these purposes the glass or transparency has been sealed by packing, washers, or other mode of reinforcement. Such packing or sealing of the glass is always a source of trouble. The nature of the reinforcement is usually such that it is very susceptible to wear, and the action of the high pressure upon it is also extremely bad, especially when the bull's-eye or sight forms a part of a lubricator or other device used in connection with an engine or boiler running under very high pressure.

My invention accordingly consists in a form of bull's-eye which is not only very simple in its construction and absolutely unbreakable, but the glass or transparency needs no sealing, packing, or other reinforcement to keep it tight and secure, whatever the internal pressure may be.

In the drawings I have shown for the purposes of illustration the improved bull's-eye or sight applied to a lubricator to which it is especially applicable.

Figure 2:
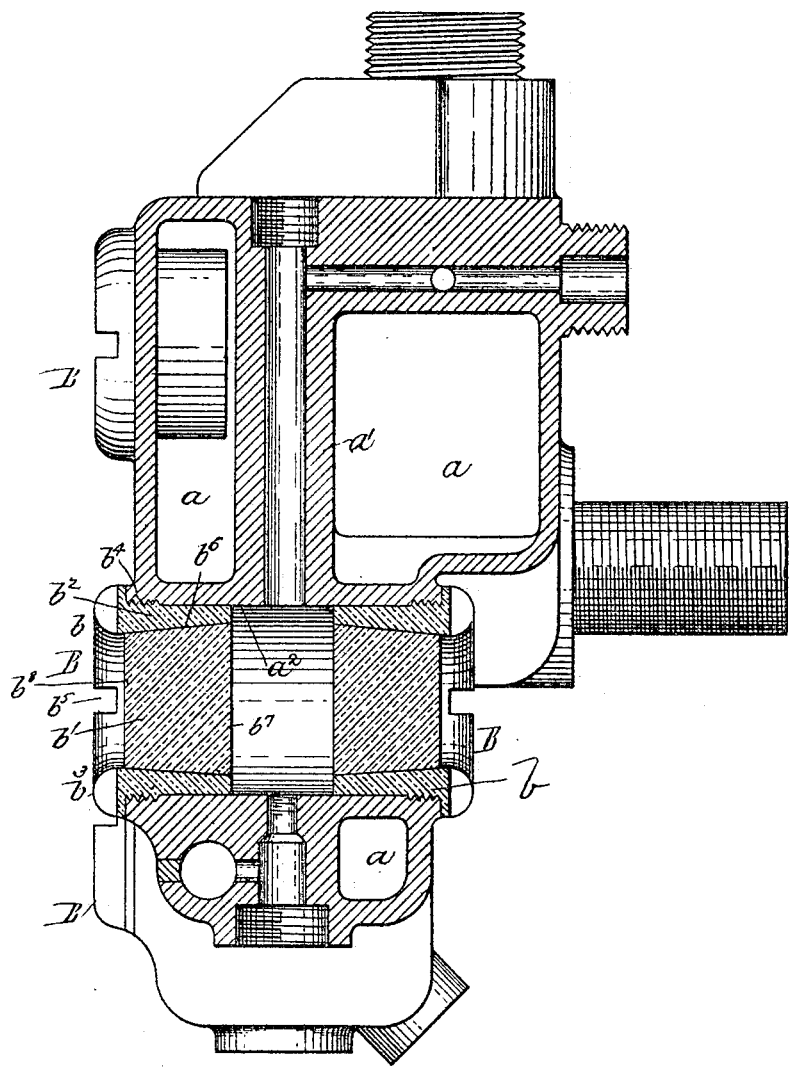
Figures 3, 4, 5:
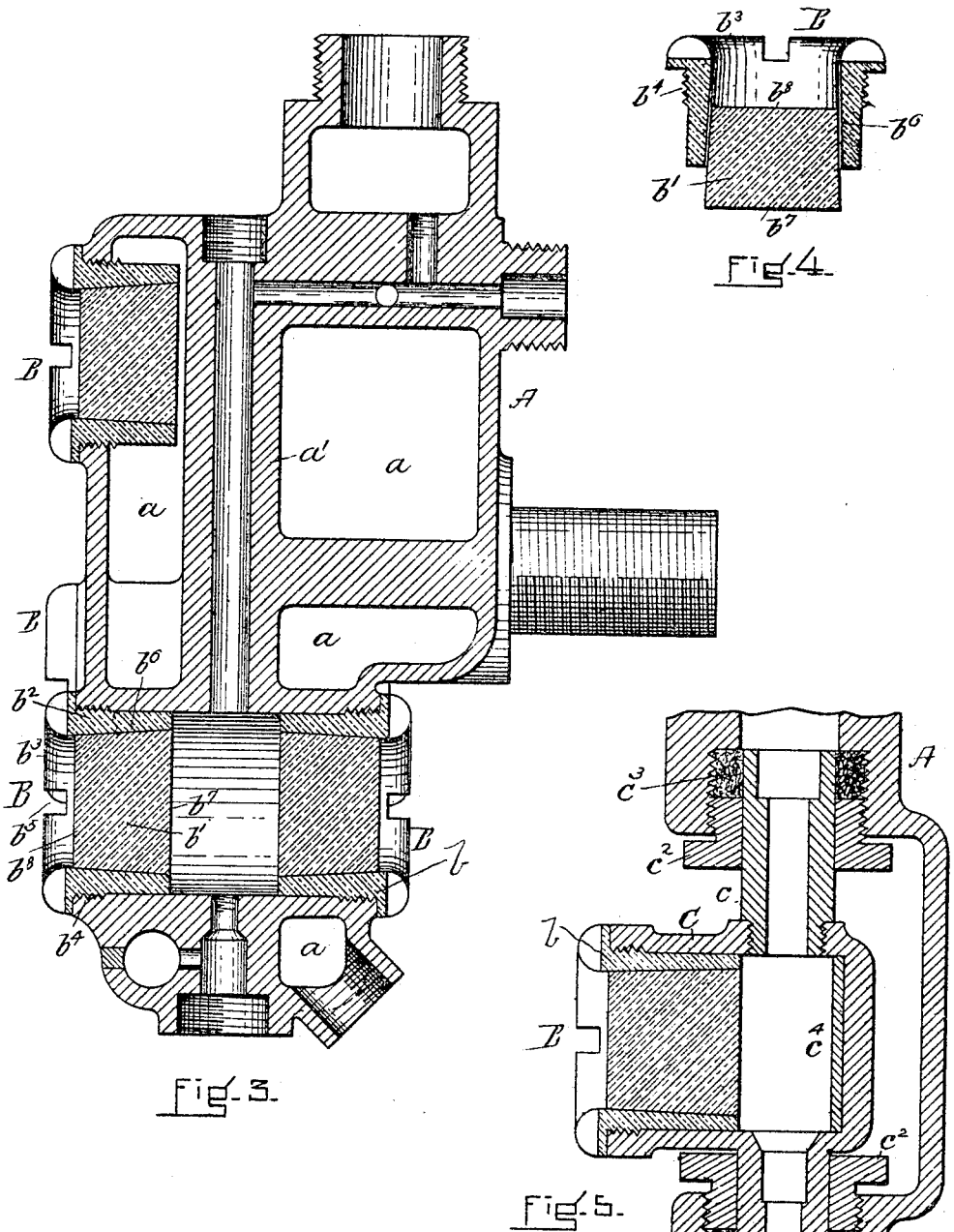

Figure 1 shows the lubricator in front elevation fitted with my improved form of bull's-eye or sight. Fig 2 shows the same in vertical cross-section on the line 2 2 of Fig. 1. Fig. 3 shows the same on the line 3 3 of Fig. 1. Fig. 4 shows in detail a cross-section of the improved bull's-eye or sight. Fig. 5 shows in cross vertical section a portion of an old form of lubricator fitted with the same.

In the drawings, A represents the body or shell of the lubricator, containing an oil-chamber $a$ and one or more water-columns $a'$, through which the oil is fed. In the form of lubricator illustrated, which is one especially adapted to be used on a locomotive, three of these water-columns are shown, two for the feed of oil to the cylinders and the third for the feed of oil to the air-brake. The lubricator shown is also one acting on the well-known Siebert principle, in which the oil in the oil-chamber is kept under boiler-pressure and fed in drops or globules up through the water-columns, the water in which is also under pressure.

Set into the shell of the lubricator are a series of bull's-eyes B, one bull's-eye being set into that portion of the body of the lubricator forming a part of the oil-chamber, by which bull's-eye an internal sight may be taken for determining the amount of oil in said chamber. The bull's-eye is set, preferably, near the top of the chamber in order that the line or level showing the amount of oil therein may show only when the oil in the chamber is approaching exhaustion, for in this type of lubricator the oil floats upon the water which fills that portion of the oil-chamber not containing oil, the operation being also such that water will enter the oil-chamber to take the place of the oil fed away, with the effect that the line of oil and water gradually rises as the oil feeds away, the line showing near the top of the lubricator or in line with the bull's-eye B when the oil is nearly exhausted. Sights B are also set into other portions of the shell or body of the lubricator at the ends of or in passages $a^2$, leading from the outside into the respective water-columns, by which a sight may be taken inside the same and the feed of the oil therein be seen. I prefer that the passage $a^2$ be extended directly through the body of the lubricator, (see Figs. 2 and 3,) entering into the water-columns from the front and back in order that bull's-eyes may be set into the respective ends of the passages on the front and back and so a sight be taken directly through the water-column when the globule of oil rising therein may clearly be seen.

With reference now more especially to the structure of the new form of bull's-eye or sight B, it comprises a hollow plug $b$, carrying a glass or other transparency $b'$. The plug has a body $b^2$ and head $b^3$. On the outside of the body portion of the plug are cut threads $b^4$, by which it may be screwed or fitted into the shell or wall of the lubricator or other device or of any chamber or passage where a sight is needed. These threads are cut, preferably, near the head $b^3$ of the plug in order that the head may be seated when the plug has been screwed into place and overlapping may protect the joint so obtained. The head of the plug is also provided with cross-slots $b^5$, by which a wrench or other instrument may be applied to the plug to screw or unscrew it.

The plug $b$ is made of some considerable length and the glass also is very thick. The hollow internal of the plug is made tapered, its interior surface $b^6$ tapering inwardly from the inner end of the plug toward its head, there being formed a relatively long, tapering, and preferably conical recess or pocket into which the glass fits. The glass is made to fit into the recess or pocket prepared for it in the plug by reason of its being properly sized and externally tapered to correspond with the internal taper of the plug and to thereby fit contiguously the internal surface thereof. It is also to be noted that the glass is so thick and fits into the hollow of the plug so that its larger end $b^7$ comes about flush with the inner end of the plug, while its smaller end $b^8$ sets somewhat in from the head of the plug, so as to be protected thereby.

The essential utility of the new form of bull's-eye or sight resides in the fact of its very simple structure, its absolute unbreakability, and especially the fact that no sealing, packing, or other reinforcement need be used to keep the glass tight, for the plug made long as it is and the glass thick, to fit as it does into the plug, there is provided a considerable extent of bearing or contacting surface between the external surface of the glass and the internal surface of the plug, which continuity of surface not only holds the glass in place, but makes also a tight joint. In other words, the glass is self-sealing into the plug. To express this utility in further detail, the plug on the outside, by means of its threaded connection and overlapping head, makes a perfectly tight joint which practically cannot be disturbed however high the pressure may be from within. Then the glass itself, carried by the plug, is so set in and protected by the head of the plug that it cannot be broken by a blow from without, and its very thickness and the manner of its bearing against the plug supporting it gives absolute surety against breakage from within. Then with the parts so constructed and relatively disposed the glass may be made to fit perfectly tight into the plug without the aid of washers or packing, with the effect that the higher the pressure the more tightly will the glass be held in place, for the parts combining as they do the large end of the glass will be exposed to the pressure on the inside, with the effect that the higher the pressure the more the glass will be pressed into its socket and the more tightly it will be held in place. Moreover, a sight of the kind just described has much utility by reason of the fact that its glass can easily be taken out and cleaned. The glass is extremely likely to become blurred by the deposit of dirt or sediment in the fitting, and unless the glass can readily be cleaned the efficiency of the sight is much impaired. With my improved sight, however, each glass can be taken out and cleaned simply by unscrewing the plug which carries it.

A bull's-eye or sight made in the manner described, besides its efficiency in a lubricator, as said before, may of course be used in other capacities for inspecting the conditions, position, or operation of any matter or medium under high pressure.

In Fig. 5 I have shown the new form of bull's-eye or sight applied to an old form of lubricator or one which has hitherto been supplied with tubular glass sights. The application is by means of a fitting which is simply inserted in place of the glass tube before used. It comprises a chambered member C, having members $c$ and $c'$, by which it may be joined to the body of the lubricator, and in this connection it is to be noted that the member $c$ is made a screw member in order that the fitting may be inserted, while the member $c'$ may be cast integrally with the member C, as shown. The connecting members $c$ and $c'$ are made of the same size and shape as the glass tube before used, so that the same connections may be made without new or extra part, the connection usually comprising a screw-washer $c^2$, reinforced by packing $c^3$. Both members $c$ and $c'$ are made hollow, and they, with the interposed chambered member C, simply form a water-column for the entry of oil or water just as the tubular glass did; but the sight instead of being taken through the glass is taken through the bull's-eye B, which is inserted in the forward end of the member C, made to receive it. Owing to the interference of the body of the lubricator a bull's-eye could not be used at the rear end of the member C in line with the forward bull's-eye, so that the sight could be taken directly through the member, as might be the preferred construction. Instead a reflector $c^4$, preferably of some white substance, is placed in the rear of the member C in line with the bull's-eye, against which reflector a sight may clearly be taken.

Having thus fully described my invention, I claim and desire to secure by Letters Patent of the United States—

1. A bull's-eye or sight of the character specified, comprising a relatively long, solid, hollow plug, tapered inwardly from the inner end of the plug toward its head, and combined therewith, a thick, solid transparency fitting within the hollow of the plug, said transparency being made externally tapered to correspond with the internal taper of the plug for combining contiguously with the internal surface thereof so as to be held thereby, and whereby, also said transparency and plug will be self-sealing.

2. A bull's-eye or sight of the character specified, comprising a relatively long, solid, hollow plug, on the outside provided with threads, whereby it may be screwed into any fixture of support, and on the inside made tapered inwardly from the inner end of the plug toward its head, and combined therewith, a thick, solid transparency fitting within the hollow of the plug, said transparency being made externally tapered to correspond with the internal taper of the plug for combining contiguously with the internal surface thereof so as to be held thereby, and whereby, also said transparency and plug will be self-sealing.

3. A bull's-eye or sight of the character specified, comprising a solid plug having body and head portions, said body of the plug being made relatively long and threaded on the outside, whereby said plug may be screwed into any fixture of support, said plug also being made conically tapered inwardly from the inner end of the body of the plug toward its head, and combined therewith a thick, solid transparency set within the hollow of the plug and slightly in from the head thereof, said transparency being made also externally tapered to correspond with the internal taper of the body of the plug so as to combine contiguously with the internal surface thereof, and whereby said transparency and plug will be self-sealing.

CHARLES B. BOSWORTH.

Witnesses:
 JOHN E. R. HAYES,
 J. M. DOLAN.